No. 698,500. Patented Apr. 29, 1902.
N. F. HOFFMAN.
OVEN.
(Application filed Feb. 11, 1902.)
(No Model.)

Witnesses
T. P. Brett

Inventor
N. F. Hoffman
By
Attorneys

THE NORRIS PETERS CO., PHOTO-LITHO., WASHINGTON, D. C.

UNITED STATES PATENT OFFICE.

NELLIE F. HOFFMAN, OF ARLINGTON, SOUTH DAKOTA.

OVEN.

SPECIFICATION forming part of Letters Patent No. 698,500, dated April 29, 1902.

Application filed February 11, 1902. Serial No. 93,524. (No model.)

*To all whom it may concern:*

Be it known that I, NELLIE F. HOFFMAN, a citizen of the United States, residing at Arlington, in the county of Kingsbury, State of South Dakota, have invented certain new and useful Improvements in Ovens; and I do hereby declare the following to be a full, clear, and exact description of the invention, such as will enable others skilled in the art to which it appertains to make and use the same.

This invention relates to stoves; and it has for its object to provide an attachment or device for use in connection with an oven to prevent burning of bread while the latter is baking therein, a further object of the invention being to provide a construction which will be simple and cheap of construction and to which the bread-pan may be easily applied and from which it may be as readily removed.

Other objects and advantages of the invention will be understood from the following specification.

Figure 1:
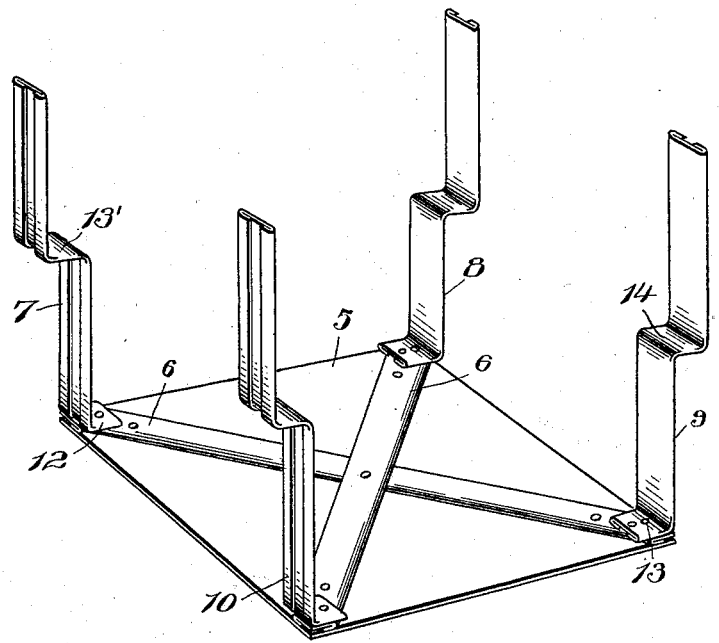
Figure 2:
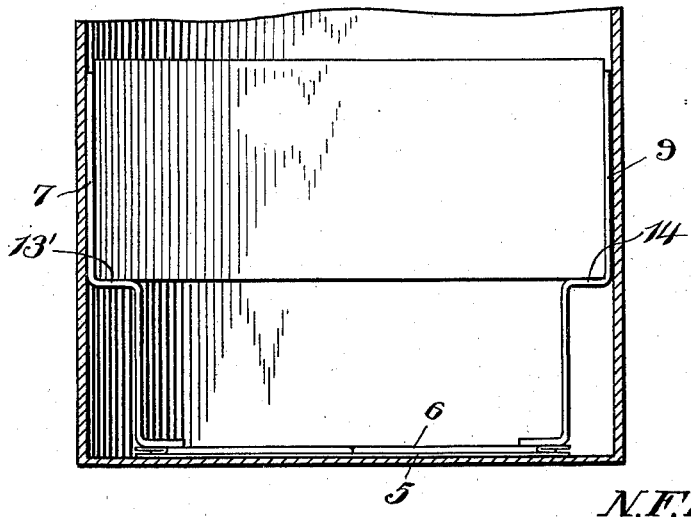

In the drawings forming a portion of this specification, and in which like numerals of reference indicate similar parts in the several views, Figure 1 is a a perspective view of the attachment removed from the oven. Fig. 2 is a transverse vertical section through an oven and showing a bread-pan supported therein.

Referring now to the drawings, the present device is in the nature of a support for a bread-pan, to hold it in such position within the oven that there may be a free circulation around all parts of the pan save at the four small points of support, with the result that there will be practically an even temperature of the contents of the pan, and burning of the crust before the inside of the contents is cooked will be prevented. For this purpose a base 5 is provided in the form of a flat metal plate, and diagonally of the upper face of the base are secured the strengthening-ribs 6, which terminate flush with the corner edges of the base-plate.

In connection with the base-plate four supporting-uprights 7, 8, 9, and 10 are employed, each of which is formed of a sheet of metal having its longitudinal edges turned over upon itself to strengthen the structure, so that it may the better resist bending, and one end of each of these uprights is bent laterally at right angles to form a foot 12, which is disposed against the upper face of one end of a rib 6, in which position it is secured by rivets 13, passing through the rib and plate. The feet of the several uprights are disposed inwardly of the plate, and the feet of the two uprights at one side of the plate project in the direction of the opposite uprights.

At points about midway of their heights the uprights are bent or outwardly offset, as shown, to form horizontal shoulders 13' and 14, the uprights at one side being offset in a direction opposite to those of the opposite side, and the shoulders thus formed are adapted to receive and support the bread-pan.

In practice the device is slid into an oven with the uprights standing close to the side walls of the oven, and the bread-pan instead of being placed upon the bottom of the oven is slid into position to rest upon the shoulders 13' and 14.

With this construction it will be seen that the heated air in the oven has access to all parts of the pan and that the pan may be easily and quickly placed upon and removed from the supporting-shoulders.

In practice modifications of the specific construction shown may be made and any suitable materials and proportions may be used for the various parts without departing from the spirit of the invention.

What is claimed is—

A device of the class described comprising a base-plate having diagonal strengthening-ribs and uprights secured upon the ribs at the ends thereof, the upper portions of the uprights at opposite sides of the base-plate being laterally offset in opposite directions at points intermediate of their ends to form supporting-shoulders and guides thereabove.

In testimony whereof I affix my signature in presence of two witnesses.

NELLIE F. HOFFMAN.

Witnesses:
WILLIAM COLLIN,
WM. T. ALLEN.